May 7, 1929. E. W. WILLIAMS 1,712,014
CUSHIONING AND SHOCK ABSORBING DEVICE
Filed Jan. 7, 1927
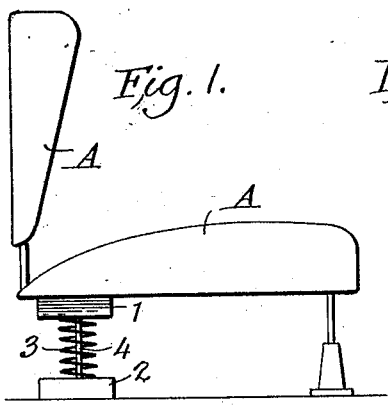
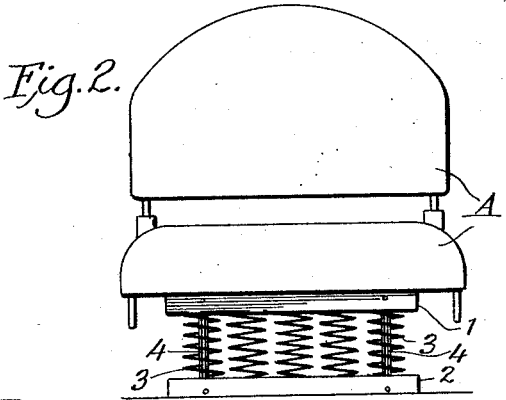
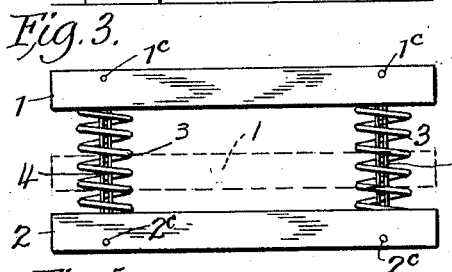
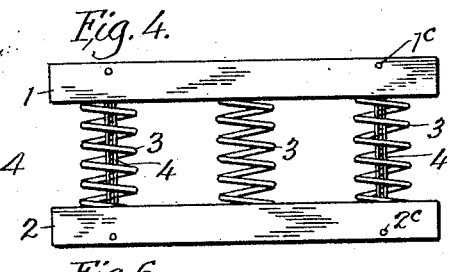
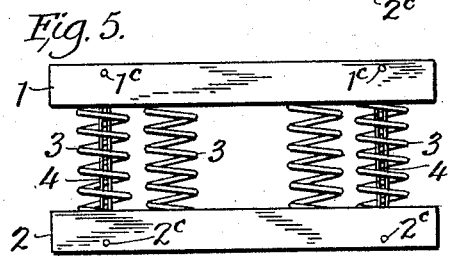
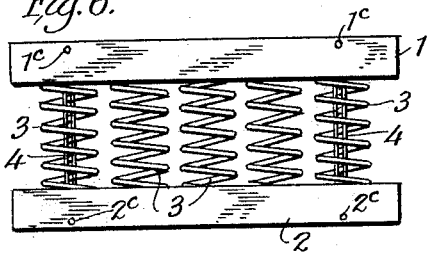
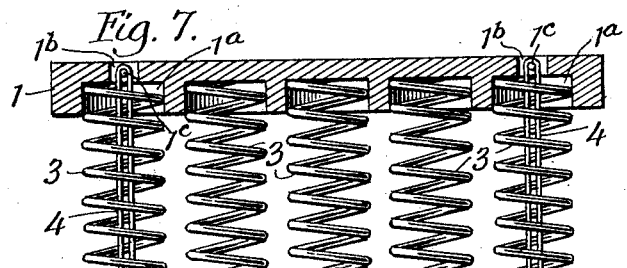
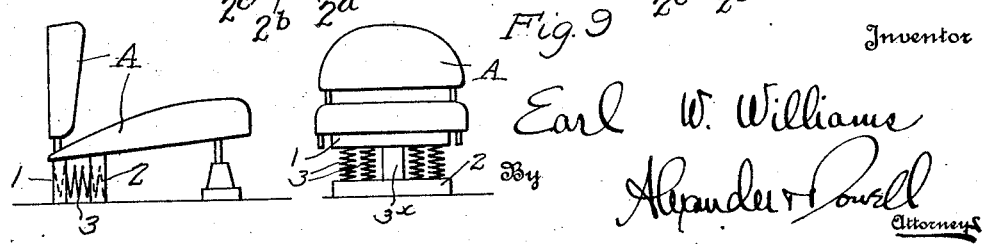
Inventor
Earl W. Williams
By Alexander & Powell
Attorneys Patented May 7, 1929.

1,712,014

UNITED STATES PATENT OFFICE.

EARL WILLARD WILLIAMS, OF BENNINGTON, VERMONT.

CUSHIONING AND SHOCK-ABSORBING DEVICE.

Application filed January 7, 1927. Serial No. 159,542.

This invention is a novel cushioning or shock absorbing device for automobile chair seats, and is particularly adapted for use in connection with the hinged or folding seats of the well-known coach-type bodies now used on a great many automobiles, the front seat of the coach being divided one half being adapted to be hinged forwardly to provide passage clearance to and from the rear seat.

The principal object of the invention is to provide a very simple and inexpensive device which may be placed as a separable unit under the seat to cushion or absorb the vibrations which are transmitted by the motion of the vehicle chassis; and also to provide an adjustable cushioning or shock absorbing device which will not require attachment by means of tools of any kind nor become a fixed part of the seat.

Other objects of the invention will be hereinafter set forth.

I will explain the invention with reference to the accompanying drawings to enable others to adopt and use the same and will summarize in the claim the novel features of construction and novel combinations of parts for which protection is desired.

In said drawings:

Fig. 1 is a side elevation of a folding chair seat of an automobile equipped with my novel shock absorber;

Fig. 2 is a rear end elevation thereof;

Figs. 3, 4, 5, and 6 are enlarged views showing my shock absorber with various arrangements of the springs, and also showing in dotted lines in Fig. 3 the device compressed.

Fig. 7 is an enlarged longitudinal section through the complete shock absorber.

Fig. 8 is a view similar to Fig. 1 but showing the device turned on its side.

Fig. 9 shows a modification.

As shown in the drawings, my novel shock absorber preferably comprises opposed members 1 and 2, preferably formed of wood or metal and of rectangular cross-section, said members 1 and 2 being of same length and width, to suit the particular folding seat A with which same is to be used. In the opposed faces of members 1 and 2 are series of opposed circular recesses $1^a$ and $2^a$, said recesses being preferably of the same diameter as the diameter of coil springs 3 which extend between the members 1 and 2 and have their ends inserted in the recesses $1^a$ and $2^a$. Springs 3 are all of same length.

In the center of the recesses $1^a$ and $2^a$ at the ends of members 1 and 2, are holes $1^b$, $2^b$, and transfixing openings $1^b$, $2^b$, are pins $1^c$ and $2^c$ around which extend bands 4 of rubber or other flexible material whereby members 1 and 2 will be yieldably urged towards each other to maintain the ends of springs 3 in the recesses $1^a$ and $2^a$ while permitting the members 1 and 2 to be pulled apart a sufficient distance to insert or remove one or more springs 3 from the device.

The shock absorber is adapted to be placed under the rear end of the folding chair seat A between the bottom of the seat and the floor boards of the automobile, and when so placed will greatly relieve the jarring and discomfort due to uneven roads, and sudden changes in speed of the vehicle.

The device may be adjusted for lighter loads by moving the absorber towards the front end of the seat; also for light loads all the springs 3 except the end springs may be removed as shown in Fig. 3 from between the members 1 and 2; or as shown in Fig. 4 the middle spring and the two end springs may be used. As shown in Fig. 5 the center spring alone has been removed; while in Fig. 6, for heavy loads all of the springs have been inserted between the members 1 and 2. Hence my novel shock absorber permits variations of two, three, four, or five springs.

My novel shock absorber is preferably made as a separate unit and may be made in various sizes to suit the folding seats of any type of automobile.

The device does not require attachment by means of tools of any kind, nor does same become a fixed part of the seat. The same may be removed easily if desired, and the seat supported by means of the solid props with which such seats are usually equipped. The device may be adjusted to suit the weight of the person using the seat by either adjusting the position of the device under the seat, or by removing or adding one or more springs as above described.

Also by adjusting the number of springs and the position of the device, the seat may be caused to ride with the springs of the device nearly shut as shown in dotted lines in Fig. 3, or but slightly depressed; also rigidity may be obtained by turning the device on its side, as shown in Fig. 8 and if this brings the seat too low, a solid member 3ˣ may be inserted in place of center spring 3, as shown in Fig. 9.

I do not limit my invention to the exact form shown in the drawing, for obviously changes may be made therein within the scope of the claim.

I claim:

An improved article of manufacture, comprising a seat, means for pivotally connecting said seat in spaced relation to a support, a detached spring unit under the rear portion of said seat comprising relatively broad elongated rigid top and bottom members having a plurality of compression springs interposed therebetween and flexible limiters tieing said members together, the said unit being adapted to support said seat either in its upright or edgewise positions.

In testimony that I claim the foregoing as my own, I affix my signature.

EARL WILLARD WILLIAMS.